(12) United States Patent
Özbek et al.

(10) Patent No.: US 6,668,228 B1
(45) Date of Patent: Dec. 23, 2003

(54) METHOD OF ATTENUATING NOISE IN THREE DIMENSIONAL SEISMIC DATA USING A PROJECTION FILTER

(75) Inventors: Ali Özbek, Milton (GB); Ahmet Kemal Özdemir, Ankara (TR); Ralf Ferber, Horsham (GB); Kamil Zerouk, Hove (GB)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 09/889,239
(22) PCT Filed: Jan. 12, 2000
(86) PCT No.: PCT/GB00/00058
§ 371 (c)(1),
(2), (4) Date: Oct. 9, 2001
(87) PCT Pub. No.: WO00/42448
PCT Pub. Date: Jul. 20, 2000

(30) Foreign Application Priority Data

Jan. 14, 1999 (GB) .............................................. 9900723

(51) Int. Cl.[7] .................................................. G01V 1/28
(52) U.S. Cl. ........................................................ 702/17
(58) Field of Search ....................... 702/17, 14; 367/45, 367/73, 72

(56) References Cited

U.S. PATENT DOCUMENTS

| 5,182,729 A | 1/1993 | Duren et al. |
| 5,677,892 A | 10/1997 | Gulunay et al. |
| 5,771,203 A | 6/1998 | Soubaras |

OTHER PUBLICATIONS

Abma, R. and Claerbout, J. Lateral prediction for noise attenuation by t–x and f–x techniques Geophysics, vol 60, no 6, Nov.–Dec. 1995, pp. 1887–1896.

Li, Q., Vasudevan, K. and Cook. F. A. Short Note: 3–D coherency filtering Geophysics, vol 62, no 4, Jul.–Aug. 1997, pp. 1310–1314.

Claerbout, J. Multidimensional recursive filters via a helix Geophysics, vol 63, no 5, Sep.–Oct. 1998, pp. 1532–1541.

Chase, M. Random noise reduction by FXY prediction filtering EAGE Conf. Exp. Abs., Paris, 1992, B043, pp. 164–165.

Chase, M. Random noise reduction by 3–D spatial prediction filtering SEG Ann. Mtg. Exp. Abs., New Orleans, 1992, pp. 1152–1153.

(List continued on next page.)

*Primary Examiner*—Donald E. McElheny, Jr.
(74) *Attorney, Agent, or Firm*—William L. Wang; William B. Batzer; John J. Ryberg

(57) ABSTRACT

A method of attenuating noise in three dimensional seismic data using a projection algorithm is disclosed. A frequency—space—space ("f-xy") projection algorithm is used which is a generalization of the f-x projection algorithm. The predictability of the seismic signals in the f-xy domain constitutes the basis of the algorithm. Specifically it is demonstrated that if the seismic events are planar in the t-xy domain, then in the f-xy domain they consist of predictable signals in the xy-plane for each frequency f. A crucial step of the 2-D spectral factorization is achieved through the helical coordinate transformation. In addition to the disclosed general algorithm for arbitrary coherent noise, a specialized algorithm for random noise is disclosed. It has been found that the disclosed projection algorithm is effective even in extreme cases of poor signal to noise ratio. The algorithm is also signal preserving when the predictability assumptions hold.

7 Claims, 16 Drawing Sheets

OTHER PUBLICATIONS

Gulunay, N., Sudhakar, V., Gerrard, C. and Monk, D. Prediction filtering for 3–D poststack data SEG Ann. Mtg. Exp. Abs., Washington D.C., 1993, pp. 1183–1186.

Canales, L. L. Seismic Processing IV: Random noise reduction SEG Ann. Mtg. Exp. Abs., Atlanta, 1984, pp. 525–527.

Gulunay, N. FXDECON and complex wiener prediction filter SEG Ann. Mtg. Exp. Abs., Houston 1986, pp. 279–281.

Soubaras, R. Signal–preserving random noise attenuation by the f–x projection SEG Ann. Mtg. Exp. Abs., Los Angeles, 1994, pp. 1576–1579.

Soubaras, R. Deterministical and statistical projection filtering for signal–preseving noise attenuation EAGE Conf. Exp. Abs., Glasgow, May 1995, A051 (2 pages).

Soubaras, R. Prestack random and impulsive noise attenuation by f–x projection filtering SEG Ann. Mtg. Exp. Abs., Houston, 1995, pp. 711–714.

Soubaras, R. The necessary and sufficient condition for lossless sampling EAGE Conference and Technical Exhibition, Geneva, May 1997, A037 (2 pages).

Le Roux, J. and Dubus, F. On the relationship betwen 1–D and 2–D spectral factorization–application to the analysis of the stability of 2–D transfer functions Signal Processing vol 16, No. 3, pp. 219–232, Mar. 1989.

Galigekere, R. R., Plotkin, E. I. and Swamy, M. N. S. Two–dimensional spectral factorization in the radon space IEEE Stat. Signal and Array Processing $7^{th}$ SP Workshop, Jun. 1994, pp. 15–18.

Wilson, G. Factorization of the covariance generating function of a pure moving average process SIAM J. Numer. Anal. vol 6, no 1, Mar. 1969, pp. 1–7.

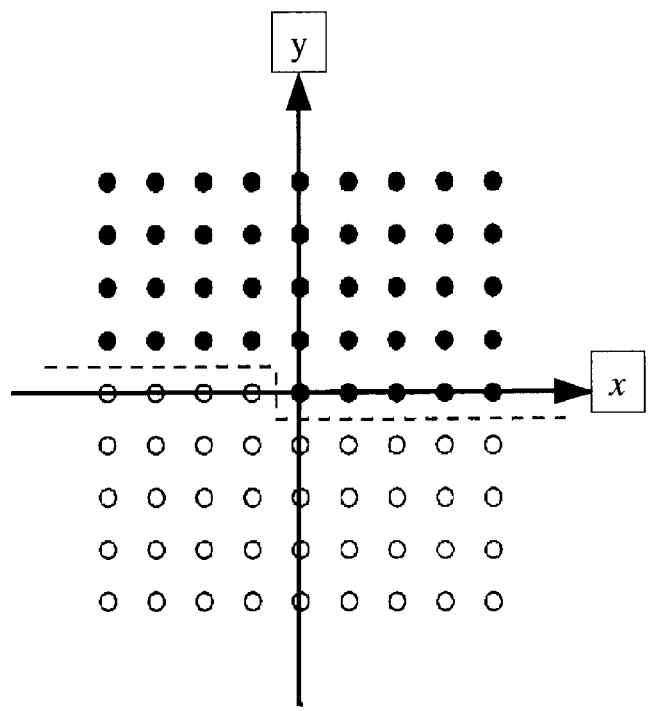
Fig. 1
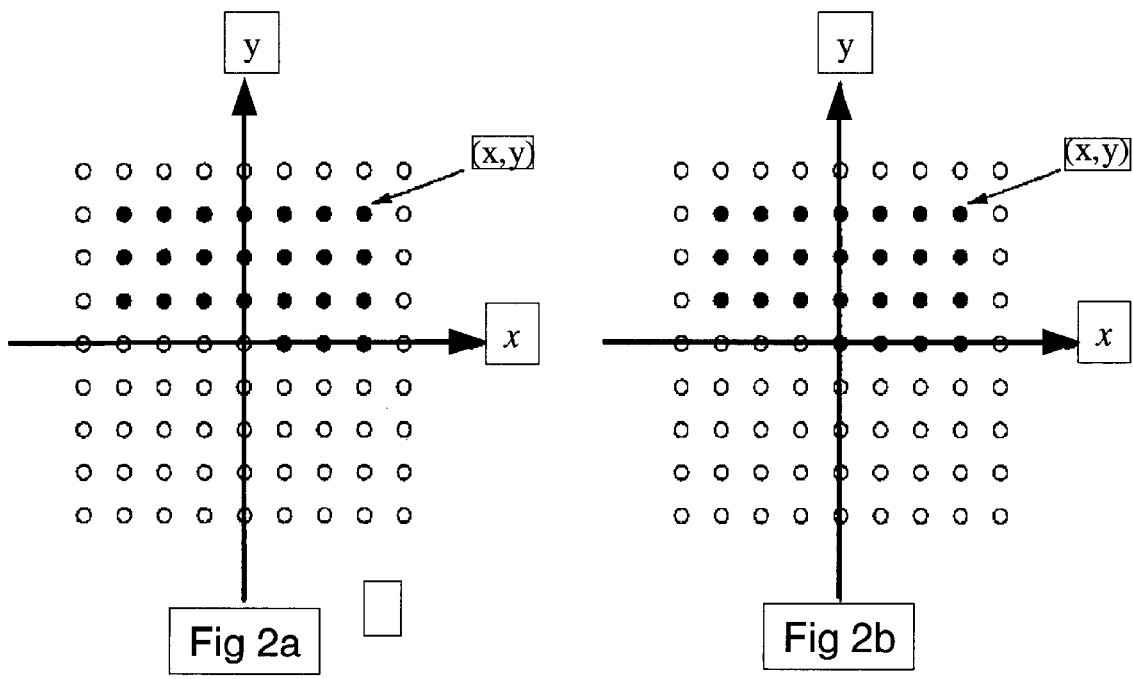
Fig 2a
Fig 2b

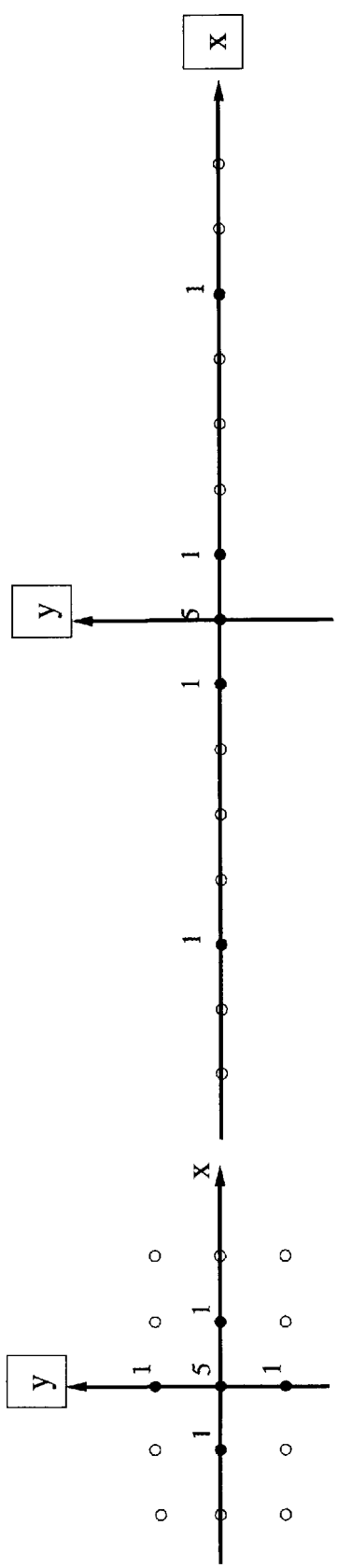
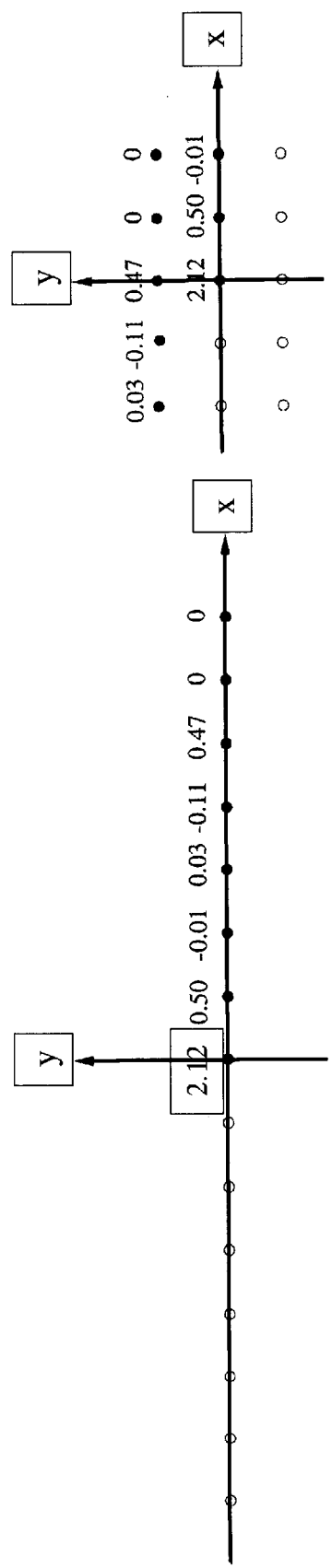
Fig. 3
Fig. 4

METHOD OF ATTENUATING NOISE IN THREE DIMENSIONAL SEISMIC DATA USING A PROJECTION FILTER

FIELD OF THE INVENTION

The present invention relates to the field of seismic data processing. In particular, the present invention relates to methods of attenuating noise in three-dimensional seismic data.

BACKGROUND OF THE INVENTION

A seismc signal which consists of only linear events has an f-x domain representation which is predictable in x for each frequency f. A generalization of this results is easy to show: the f-xy domain representation of a 3-D (time—space—space) seismic signal, which consists of only planar events, is perfectly predictable in the xy-plane for each frequency f. The significance of this result is that, some problems such as reducing noise in a 3-D volume can be reduced to a set of 2-D problems in the xy-plane, which are easier to solve. For each frequency f, the noise is attenuated regardless of the data at other frequencies. For this purpose, what is needed is an algorithim which separates 2-D predictable data from additive noise. F-xy prediction (i.e. f-xy decon) is conventionally used for this purpose. For example, see the following references: M. Chase, "Random noise reduction by FXY prediction filtering," *EAGE Conf. Exp. Abs., Paris*, pp. 164–165, 1992; M. Chase, "Random noise reduction by 3-D spatial prediction filtering," *SEG Ann. Mtg. Exp. Abs., New Orleans*, pp. 1152–1153, 1992; and N. Gulunay, V. Sudhakar, C. Gerrard, and D. Monk, "Prediction filtering for 3-K poststack data," *SEG Ann. Mtg. Exp. Abs.*, Washington, D.C., pp. 1183–1186, 1993.

Unfortunately, the f-xy prediction methods suffer from model inconsistency problems. The model inconsistency in the f-xy prediction method adversely affects signal preservation and noise attenuation when applied to seismic data. This disadvantage is similar to the model inconsistency problem in the 1-D counterpart to the f-xy prediction method, namely the f-x prediction algorithm. For an example of f-x prediction, see: Canales, "Random noise reduction," 54th *SEG Ann Mtg. Exp. Abs., Atlanta*, pp. 525–527, 1984; and N. Gulunay, "FXDECON and complex wiener prediction filter," *SEG Ann, Mtg. Exp. Abs., Houston*, pp. 279–281, 1986.

The f-x projection algorithm is described in for example, the following references: R. Soubaras, "Signal-preserving random noise attenuation by the f-x projection," *SEG Ann Mtg. Exp. Abs., Los Angeles*, pp. 1576–1579, 1994; R Soubaras, "Deterministic and statistical projection filtering for signal-presrving noise attenuation," *EAGE Conf. Exp. Abs., Glasgow.* A051, 1995; R. Soubaras, "Prestack random and impulsive noise attenuadon by f-x projection filtering," *SEG Ann. Mtg. Exp. Abs., Houston*, pp. 711–714, 1995; R. Soubaras, "the necessary and sufficient condition for lossless-sampling," *EAGE Conference and Technical Exhibition, Geneva,* 1997; and U.S. Pat. No. 5,771,203. However, the f-x projection algorithm has the limitation in that it is only applicable to 2-D data.

SUMMARY OF THE INVENTION

Thus, it is an object of the invention to provide a noise attenuation algorithm that does not suffer from the same problems and limitations of the prior art. In particular, it is an object of the invention to provide an algorithm for attenuating noise in three-dimensional seismic data which does not suffer from model inconsistency problems known in conventional methods.

According to the invention, a method of attenuating noise in three dimensional seismic data is provided. The method includes receiving seismic data representing data gathered in at least two spatial dimensions and a time dimension. The seismic data includes both a noise component and a seismic signal component. The latter of which represents signals originating from at least one seismic disturbance. Values are computed for use in a projection filter, which is used to estimate the noise component of the seismic data. Spectral factorization is then performed in at least two dimensions to obtain additional two-dimensional values for use in the projection filter. The noise component in said received seismic data is estimated by using the projection filter which includes at least some of the additional two-dimensional values. The estimated noise component is then subtracted from the received data to obtain attenuated seismic data having a decreased noise component.

According to a preferred embodiment of the invention, the method also includes causing at least one seismic disturbance, recording raw data from a plurality of sensors distributed in at least two spatial dimensions; and then processing the recorded raw data to form said seismic data.

According to a preferred embodiment of the invention, the method also includes performing a Fourier Transform with respect to time of the seismic data to obtain frequency domain seismic data, selecting a single frequency from said frequency domain seismic data; and repeating for each desired frequency said steps of computing values, performing spectral factorization, estimating the noise component, and subtracting the estimated noise.

According to a preferred embodiment of the invention, the method also includes creating an initial estimate for an initial spectral factor sequence of values to be used in the projection filter, applying an all-pole filter based on the inverse of the square of the initial spectral factor sequence of values to obtain an intermediate sequence of values; computing an autocorrelation of the intermediate sequence of values; and finding coefficients for use in the projection filter by solving normal equations using the autocorrelation of the intermediate sequence of values.

According to a preferred embodiment of the invention, the spectral factorization is performed using a helical coordinate transform on the autocorrelation of the intermediate sequence of values to obtain a one-dimensional sequence, and the factorization is preformed on the one-dimensional sequence to obtain a one-dimensional factor, which is mapped into two-dimensions using an inverse of the helical coordinate transform to obtain a two-dimensional factor which represents some of said additional two-dimensional values.

According to a preferred embodiment of the invention, the noise component of the seismic data is primarily random noise, and the projection filter estimates primarily random noise.

According to another preferred embodiment of the invention, the noise component of the seismic data is primarily coherent noise, and the projection filter estimates primarily coherent noise.

BRIEF DESCRIPTION OF THE DRAWINGS

FIG. 1 illustrates the allowable support for a 2-D causal sequence;

FIGS. 2a and 2b illustrate the support of the linear predictor and prediction error filter, respectively, with parameters X and Y;

FIG. 3 illustrates an example of a 2-D autocorrelation sequence on the left and its helical coordinate transform on the right;

FIG. 4 illustrates an example of a 1-D sequence on the left and its inverse helical coordinate transform on the right;

DETAILED DESCRIPTION OF THE INVENTION

Figure 5:
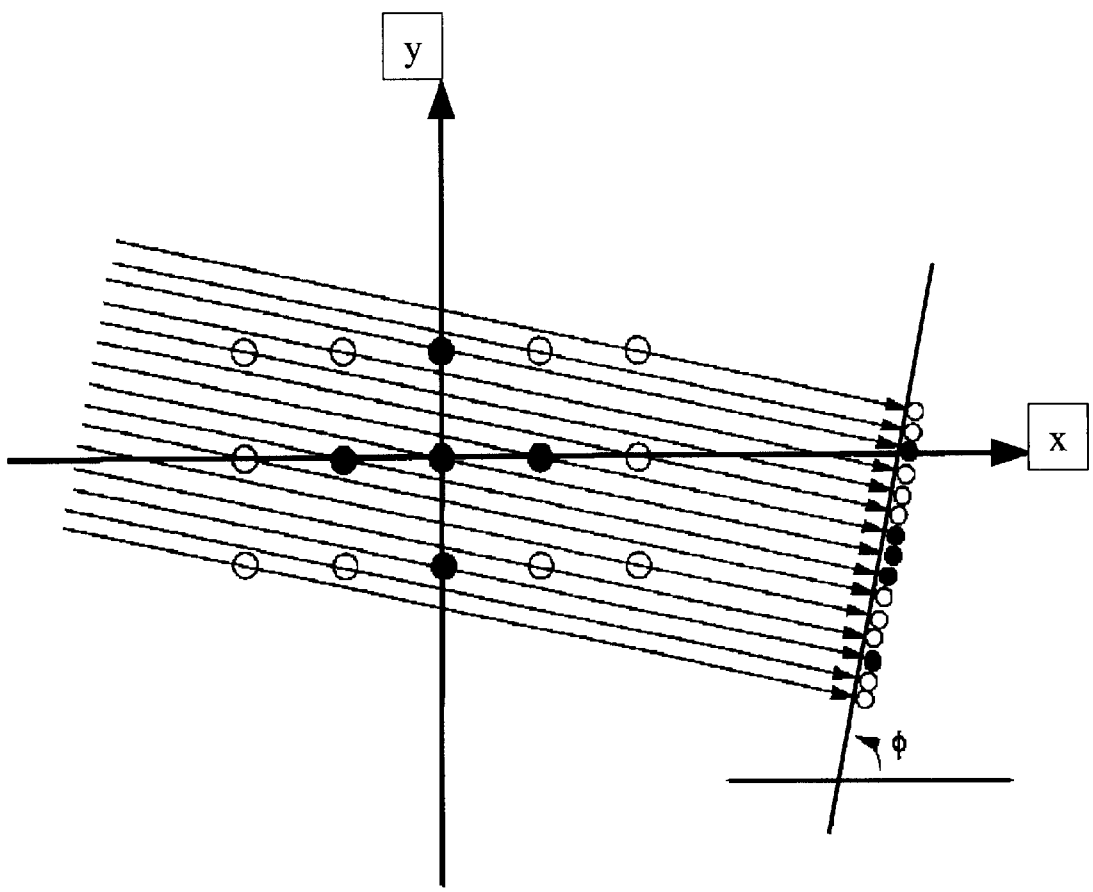
FIG. 5 illustrates an example of a helical coordinate transform or the $\phi$-Radon projection of an autocorrelation sequence.

1 Review of Some 2-D Signal Processing Concepts

In this section, we review some 2-D signal processing concepts which will be useful in our development of the f-xy projection algorithm. Most of these concepts are extensions of their 1-D counterparts, although the generalizations are not always unique or straightforward.

Causality

In 1-D, a sequence h[x] is causal if h[x]=0 for x<0. The extension of this definition to 2-D is not unique. Here we follow a common convention by calling a 2-D sequence causal, if its support is constrained into the shaded region in FIG. 1.

Stability

A 2-D filter is stable in the bounded-input, bounded-output sense if its impulse response is absolutely summable.

Minimum-phase

We define a 2-D minimum-phase (min-$\phi$) filter to be a 2-D, causal, stable filter which has a causal, stable inverse.

In the next section we review the prediction error filters and the methods used in their computation.

1.1 2-D Prediction Error Filters (PEF)

Consider the following linear prediction problem;

$$\hat{h}[x, y] = - \sum_{(m,n) \in S_{XY}} a_{XY}[m, n] h[x-m, y-n], \quad (1)$$

where $\alpha_{XY}[m, n]$ denotes the coefficients of the linear predictor with support $S_{XY}$ and parameters X, Y as illustrated FIG. 2. The corresponding PEF $$A_{XY}(z_x, z_y) = 1 + \sum_{(x,y) \in S_{XY}} a_{XY}[x, y] z_x^{-x} z_y^{-y}, \quad (2)$$

with the support shown in FIG. 2 is causal according to our definition of causality. This linear PEF is also called the forward linear prediction error filter to emphasize the fact that only the past samples (recall our causality definition) of the predicted sample are used in the prediction.

The filter coefficients, are found by solving the normal equations $$r_h[k, l] = - \sum_{(m,n) \in S_{XY}} a_{XY}[m, n] r_h[k-m, l-n] \quad \text{for } (k, l) \in S_{XY}, \quad (3)$$

where $\tau_h[k,l]$ is the autocorrelation function of h[x,y]. If the autocorrelation sequence is computed using the formula $$r_h[k, l] = - \sum_{x,y} h[x+k, y+l] h^*[x, y], \quad \text{for } (k, l) \in S_{XY}, \quad (4)$$

then the resulting method for computation of the PEF coefficients is called the covariance method or the autocorrelation method, depending the range of summation in (4). In the covariance method, the range of summation is chosen such that only the known (available) data sample are used in the computation. In the autocorrelation method, this range is extended by assuming that unknown (unavailable) data samples are zero. That is, the known segment of the input sequence h[x,y] is extrapolated with zeros.

A third way, to compute the PEF coefficients is the modified covariance method or the forward-backward method. In this method the filter coefficients are still given by the normal equations (3), however the autocorrelation sequence is computed as $$r_h[k, l] = - \sum_{x,y} (h[x+k, y+l] h^*[x, y] + h[x, y] h^*[x-k, y-l]) \quad (5)$$

$$\text{for } (k, l) \in S_{XY}.$$

Again, the range of summation is chosen such that only the known values of the data are used in the summation.

1.2 2-D Spectral Factorization

The 2-D spectral factorization problem can be phrased as follows: Given an autocorrelation sequence $\tau_c[k,l]$ with a real and nonnegative Fourier transform $R_c(k_x,k_y) \geq 0$, find a causal and min-$\phi$ sequence $c[x,y]$ such that:

$$r_c[k, l] = c[x, y] \ast\ast c^*[-x, -y] \qquad (6)$$

$$= \sum_{x,y} c[x+k, y+l] c^*[x, y]. \qquad (7)$$

We denote the 2-D convolution operator herein as **. The same problem can be equivalently expressed in the Fourier Transform domain as $$R_c(k_x,k_y) = |C(k_x,k_y)|^2, \qquad (8)$$

or in the Z-transform domain, $$R_c(z_x,z_y) = C(z_x,z_y) C^*(1/z_x^*, 1/z_y^*). \qquad (9)$$

The 2-D spectral factorization problem differs significantly from its 1-D counterpart. For example, in the 1-D case, it is always possible to find the causal, min-$\phi$ spectral factor due to the fundamental theorem of algebra. Briefly, the fundamental theorem of algebra states that a polynomial of order N can be always factored as the product of N first order polynomials over the field of complex numbers. Using this theorem, the 1-D spectral factorization problem is easy to solve: First find all the zeros (roots) of the autocorrelation function, then synthesize a sequence with the subset of these zeros which are smaller than 1 in magnitude (i.e., inside the unit circle). An implication of this spectral factorization algorithm is that, a finite extent autocorrelation sequence has a finite extent spectral factor.

The 2-D spectral factorization problem is complicated by the lack of a theorem similar to the "fundamental theorem of algebra" which applies to only 1-D polynomials. Another complication arises because a "finite" extent sequence may have an "infinite" extent spectral factor. To solve this difficult problem, some researchers have proposed to convert this 2-D problem into a 1-D problem, solve this 1-D simplified problem, then map the obtained solution back to 2D.

According to a preferred embodiment of the invention, we utilize an approach known in the field of statistical signal processing to solve the 2-D spectral factorization problem—see, e.g., J. L. Roux and P. Dubus, "On the relationship between 1-D and 2-D spectral factorization—application to the analysis of the stability of 2-D transfer functions," *Signal Processing*, vol. 16, pp. 219–232, 1989, and R. R. Galikere, E. I. Plotkin, and M. N. S. Swamy, "Two-dimensional spectral factorization in the radon space," IEEE Stat. Signal and Array Processing 7$^{th}$ SP Workshop, pp. 15–18, June 1994.

In this method, first the zero-padded autocorrelation sequence $r_c[k,l]$ is mapped to a 1-D sequence using the helical coordinate transformation as shown in FIG. 3. Basically, this transformation involves concatenating the rows of the zero-padded autocorrelation sequence to obtain a 1-D sequence. Alternatively, we may view the helical coordinate transform of a 2-D sequence as its $\phi$-Radon projection shown in FIG. 5, where the angle $\phi$ is determined by the amount of zero-padding. Once the helical coordinate transform is obtained, its 1-D spectral factor is computed (FIG. 4) using one of the 1-D spectral factorization algorithms, such as the Wilson's method—see, e.g., G. Wilson, "Factorization of the covariance generating function of a pure moving average process," *SIAM J. Numer. Anal.*, vol. 6, no. 1, pp. 1–7, March 1969. Finally, this 1-D sequence is mapped back to a 2-D sequence by inverse helical coordinate transformation as shown in FIG. 4. The resulting sequence is the same as the true 2-D spectral factor if it is of finite extent. Otherwise, the obtained 2-D sequence is only an approximation to the true spectral factor. In this case the accuracy of the approximation can be improved by increasing the amount of zero padding used in helical coordinate transformation.

The term helical coordinate transformation was first introduced by J. Claerbout in "Multidimensional recursive filters via a helix," *Geophysics*, vol. 63, pp. 1532–1541, September–October 1998, where a number of applications were shown. The use this approach for 2-D spectral factorization as shown in this invention is new in the fields of seismics and geophysics; its use for filtering of 3-D data through f-xy projection is new for any field.

2 Model of the Seismic Traces

Consider the output of an areal array of receivers, which can be represented as a 3-D signal $u(t,x,y)$ in the time x space x space domain. This trace ensemble $u(t,x,y)$ can be modeled as a clean seismic component $u_o(t,x,y)$ in additive noise $e(t,x,y)$:

$$u(t,x,y) = u_o(t,x,y) + e(t,x,y). \qquad (10)$$

Furthermore, it will be assumed that the noise-free trace ensemble $u_o(t,x,y)$ can be represented as the superposition of p arbitrary wavelets $v_j(t)$, that are delayed with arbitrary delays $d_j(x,y)$ at each value of the space variables x and y:

$$u_o(t, x, y) = \sum_{j=1}^{p} v_j(t - d_j(x, y)). \qquad (11)$$

Here the delay functions, $d_j(x,y)$, determine the shape of the seismic events in a 3-D volume. If we take the Fourier transform of $u_o(t,x,y)$ along the time dimension, we find the f-xy domain representation of the clean seismic signal as:

$$U_o(f, x, y) = \sum_{j=1}^{p} V_j(f) e^{-j2\pi f d_j(x,y)}, \qquad (12)$$

where $V_j(f)$ denotes the Fourier transform of the wavelet $v_j(t)$. If we assume that events are locally planar, then the delay functions can be represented as linear functions of the space variables x and y:

$$d_j(x,y) = a_j + b_j x + c_j y. \qquad (13)$$

Note that, if the events are not-planar, we process the events through a spatial window so that the seismic events in this window are linear. Substituting (13) into (12) we find that in the f-xy domain the seismic signal can be represented as the sum of p complex exponentials $$U_o(f, x, y) = \sum_{j=1}^{p} A_j(f) e^{-j2\pi(b_j x + c_j y)}, \qquad (14)$$

with complex amplitudes $A_j$ $$A_j(f) = |A_j(f)| e^{-j\psi_j(f)}. \qquad (15)$$

Consequently, a 3-D seismic signal which consists of only planar events, is perfectly predictable in the xy-plane for each frequency f.

Thus, in the f-xy domain the additive noise model can be written as $$U(f,x,y) = U_o(f,x,y) + E(f,x,y), \qquad (16)$$

where $U_o(f,x,y)$ is predictable in the xy-plane for each frequency f. As we show in the next section, this fact establishes the theoretical basis for the use of f-xy domain noise attenuation algorithms.

3 f-xy Projection Algorithm for Noise Attenuation

Separation of noise from the signal is an important problem in geophysics. Usually it is necessary to separate the desired seismic data, from the irrelevant noise. A major type of background noise found in seismic data is usually additive in nature. Attenuation of this background noise simplifies the interpretation of seimc data and enables the use of further signal processing algorithms.

Attenuation of the background noise can be achieved either in the f-zy domain, or in the t-xy domain. The f-xy domain algorithms have the advantage of separating a three dimensional problem into independent two dimensional problems. According to a preferrd embodiment, we shall be dealing with f-xy domain random noise attenuation. After describing the general framework in the next section, we shall present the f-xy projection algorithm for noise attenuation.

3.1 f-xy Domain Noise Attenuation Algorithms

As discussed above, the additive noise model and the planar seismic signals assumption lead to a predictable signal model in the f-xy domain. This observation motivates the use of the following algorithm for noise attenuation in the f-xy domain:

1. Find the f-xy domain representation of the data by computing Fourier transformation of the noisy data u(t,x,y) along the time dimension:

$$U(f,x,y) = \int u(t,x,y) e^{-j2\pi ft} dt. \quad (17)$$

2. For each frequency f, attenuate the noise component in (16) using the data only at that frequency $$\hat{U}_o(f,x,y) = T[U(f,x,y)], \forall f, \quad (18)$$

where T is an unspecified 2-D (i.e., space x space domain) noise attenuation algorithm and $\hat{U}_o(f,x,y)$ is the f-xy domain representation of the seismic signal estimate.

3. Find the t-xy domain representation of the signal estimate by computing the inverse Fourier transform of $\hat{U}_o(f,x,y)$ along the time dimension:

$$\hat{u}_o(f,x,y) = \int \hat{U}_o(f,x,y) e^{j2\pi ft} df. \quad (19)$$

The practical implication of the idea embodied in this algorithm is that, instead of solving the 3-D noise attenuation problem, it is sufficient to solve a set of 2-D problems in the xy-plane, which are easier to solve: for each frequency f, the noise is attenuated regardless of the data at other frequencies (second step of the algorithm). Thus, in the rest of this description we concentrate on the attenuation of the noise at an arbitrary, but fixed frequency f. For notational clarity, at this arbitrary but fixed frequency f, we suppress the frequency dependence of the variables. For instance we denote the f-xy domain representations of the signals u(t,x,y), $u_o$(t,x,y) and e(f,x,y) as $$u[x,y] \triangleq U(f,x,y): \text{Available data at frequency } f \quad (20)$$

$$u_o[x,y] \triangleq \quad (21)$$
$U_o(f,x,y)$: Noise-free seismic component at frequency $f$ $$e[x,y] \triangleq E(f,x,y): \text{Random noise component at frequency } f. \quad (22)$$

With this convention (16) simplifies as $$u[x,y] = u_o[x,y] + e[x,y], \quad (23)$$

where $u_o[x,y]$ is a perfectly predictable signal. Hence the second step of a general f-xy domain noise attenuation algorithm can be restated as the separation of the additive noise $e[x,y]$ in (23) from the predictable seismic signal $u_o[x,y]$. Although the f-xy prediction algorithm is commonly used with this objective in mind, this algorithm suffers from the model inconsistency problem like its 1-D counterpart, the f-x prediction algorithm. In the next section, we derive the f-xy projection algorithm as an alternative and consistent method. According to a preffered embodiment, the predictability assumption is relaxed, so that the resulting algorithm is more applicable to real data.

3.2 The f-xy Projection Algorithm for Noise Attenuation

In this section, we derive the f-xy projection algorithm for noise attenuation. We first derive the general equations for an arbitrary noise model, and then specialize to the random noise case. To develop a consistent algorithm, in the next section we give the details of the assumed data model.

3.2.1 Data Model

We will assume that u[x,y] consists of a quasi-predictable (rather then perfectly predictable) seismic component $u_o[x,y]$ in additive noise $e[x,y]$. The noise can in general be random or coherent.

$$u[x,y] = u_o[x,y] + e[x,y]. \quad (24)$$

By quasi predictability we mean that the seismic component, $u_o[x,y]$, filtered with PEF $a[x,y]$ produces an output, $\epsilon g[x,y]$, that is small in magnitude:

$$a[x,y] * u_o[x,y] = \epsilon_1 g_1[x,y] \approx 0, \quad (25)$$

where $\epsilon_1$ is a small number. By modeling the noise in general as coherent, we assume that when the noise is filtered with a PEF $b[x,y]$ it also produces an output that is small in magnitude:

$$b[x,y] * e[x,y] = \epsilon_2 g_2[x,y] \approx 0. \quad (26)$$

Based on this quasi-predictable model of the seismic signals, in the next section we derive the f-xy projection algorithm for noise attenuation.

3.2.2 Derivation of the Algorithm

Assume that we know the PEF $a[x,y]$ for $u_o[x,y]$ and PEF b[z,y] for e[x,y]. Define the cost function V in the wavenumber domain:

$$V = |G_1(k_x,k_y)|^2 + |G_2(k_x,k_y)|^2, \quad (27)$$

where $G_1(k_x,k_y)$ and $G_2(k_x,k_y)$ are the Fourier transforms of the signals $g_1[x,y]$ and $g_2[x,y]$, respectively. Substituting the definitions of $g_1[x,y]$ and $g_2[x,y]$ into (27) we obtain:

$$V = \frac{1}{\epsilon_1^2} |A(k_x,k_y)U_o(k_x,k_y)|^2 + \frac{1}{\epsilon_2^2}|B(k_x,k_y)E(k_x,k_y)|^2. \quad (28)$$

In this last equation we observe that $\epsilon_1$ and $\epsilon_2$ determine the relative importance of the two terms in the cost function:

If $\epsilon_1 << \epsilon_2$ then the first term dominates the cost function, therefore the minimization of the cost function should produce $A(k_x,k_y)U_o(k_x,k_y)=0$. This produces a perfectly predictable seismic component that is closest to the data.

If $\epsilon_1 >> \epsilon_2$ than the second term dominates the cost function. This reflects our belief that residual noise level (i.e., prediction error resulting from application of b[x,y] to e[x,y]) is low. In this case the solution for $U_o(k_x,k_y)$ will be only quasi-predictable, but it will be closer to the observed data.

If we use the additive noise model then we can express the cost function in (28) only as a function of the noise component:

$$V = \frac{1}{\epsilon_1^2}|A(k_x,k_y)(U(k_x,k_y)-E(k_x,k_y))|^2 + \frac{1}{\epsilon_2^2}|B(k_x,k_y)E(k_x,k_y)|^2. \quad (29)$$

Minimization of V in (29) over the noise component gives the estimate of $E(k_x,k_y)$:

$$\hat{E}(k_x,k_y) = \frac{|A(k_x,k_y)|^2}{|A(k_x,k_y)|^2 + \epsilon^2 |B(k_x,k_y)|^2} U(k_x,k_y) \quad (30)$$

$$\stackrel{\Delta}{=} N(k_w,k_y)U(k_x,k_y), \quad (32)$$

where $N(k_x,k_y)$ is the noise estimation filter and $\epsilon$ is $\epsilon_1/\epsilon_2$. Note that, only the relative value of $\epsilon_1$ and $\epsilon_2$ is important, because only their ratio appears in (30). $N(k_x,k_y)$ is projection filter because its spectrum mainly consists of 1's and 0's apart from the transition zones:

$$N(k_x,k_y) = \frac{|A(k_x,k_y)|^2}{|A(k_x,k_y)|^2 + \epsilon^2 |B(k_x,k_y)|^2} =$$

$$\begin{cases} 0 & \text{when } |A(k_x,k_y)| << \epsilon|B(k_x,k_y)| \\ & \text{i.e., the signal component is} \\ & \text{dominant at wavenumber}(k_x,k_y). \\ 1 & \text{when } |A(k_x,k_y)| >> \epsilon|B(k_x,k_y)| \\ & \text{i.e., the coherent noise component} \\ & \text{is dominant at wavenumber } (k_x,k_y). \end{cases}$$

Finally the estimate of the seismic component is computed using the additive noise model:

$$\hat{U}_o(k_x,k_y) = U(k_x,k_y) - \hat{E}(k_x,k_y). \quad (33)$$

In the rest of this work, we shall assume that f-xy projection algorithm is used in random noise attenuation. In this case the noise component is unpredictable, hence $B(k_x,k_y)=1$. Therefore the noise estimation filter is given as:

$$N(k_x,k_y) = \frac{|A(k_x,k_y)|^2}{|A(k_x,k_y)|^2 + \epsilon^2}, \quad (34)$$

and the estimate of the random noise component is obtained as:

$$\hat{E}(k_x,k_y) = N(k_x,k_y)U(k_x,k_y) \quad (35)$$

$$= \frac{|A(k_x,k_y)|^2}{|A(k_x,k_y)|^2 + \epsilon^2} U(k_x,k_y) \quad (36)$$

3.2.3 Space Domain Implementation of f-xy Projection Algorithm

First we define a min-$\phi$ filter $C(k_x,k_y)$ such that:

$$|C(k_x,k_y)|^2 = |A(k_x,k_y)|^2 + \epsilon^2, \quad (37)$$

i.e, the autocorrelation of the filter c[x,y] is the prewhitened autocorrelation of the PEF $\alpha[x,y]$. In Z-domain this relation can be expressed as:

$$C(z_x,z_y)C^*(1/z_x^*,1/z_y^*) = A(z_x,z_y)A^*(1/z_x^*,1/z_y^*) + \epsilon^2. \quad (38)$$

As explained in above, computing such a $C(z_x,z_y)$ from its autocorrelation is called spectral factorization.

Figure 6:
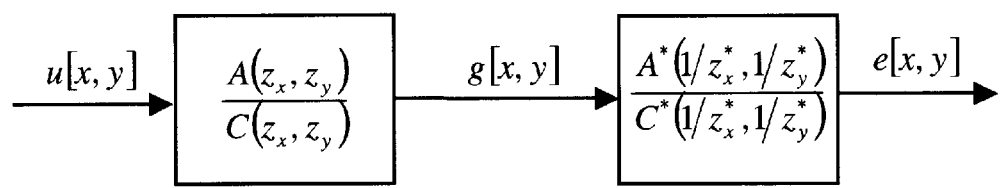
FIG. 6 shows the space domain implementation of the f-xy projection filtering, according to a preferred embodiment of the invention.

With this definition of $C(z_x,z_y)$, the expression for the computation of the random noise component in (36) becomes $$\hat{E}(z_x,z_y) = \frac{A^*(1/z_x^*,1/z_y^*)}{C^*(1/z_x^*,1/z_y^*)} \frac{A(z_x,z_y)}{C(z_x,z_y)} U(z_x,z_y), \quad (39)$$

in Z-domain. This expression suggests that, we can compute $\hat{e}[x,y]$ by passing the input through a min-$\phi$ filter $A(z_x,z_y)/C(z_x,z_y)$ and computing an intermediate output. Then this intermediate output is filtered with $A^*(1/z_x^*,1/z_y^*)/C^*(1/z_x^*,1/z_y^*)$ "backwards" in space which gives the output $\hat{e}[x,y]$. These filtering operations are shown in FIG. 6.

The min-$\phi$ property of $C(z_x,z_y)$ ensures that first filter is stable when filtering is performed "forwards" in space and the second filter is stable when the filtering is performed "backwards" in space.

3.2.4 Computation of the PEF

So far we have assumed that the PEF were known beforehand. However, this is rarely the case. If the PEF is not known it should be calculated by minimizing the output energy of the projection filter.

In Fourier domain we have the following expression:

$$|\hat{E}(k_x,k_y)|^2 = \left(\frac{|A(k_x,k_y)|^2}{|C(k_x,k_y)|^2}\right)^2 |U(k_x,k_y)|^2. \quad (40)$$

Figure 10:
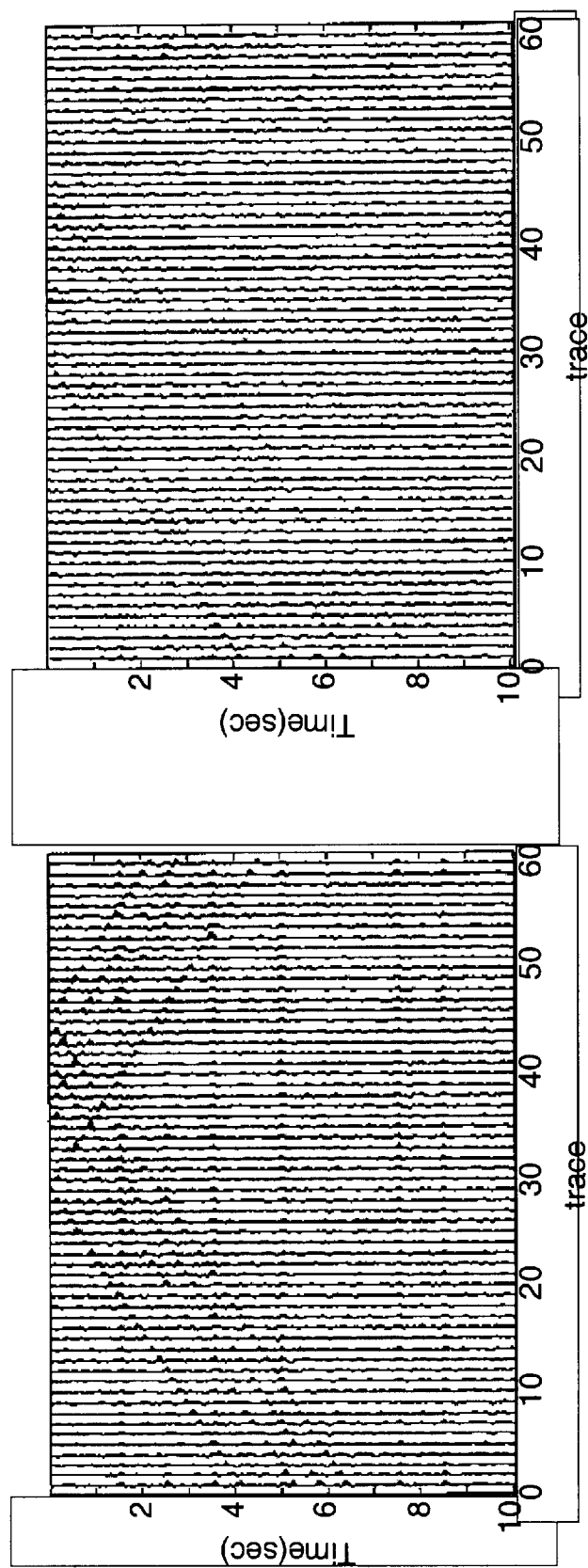
FIG. 10 illustrates the outputs of the f-xy prediction algorithm on the left and the f-xy projection algorithm on the right.
Figure 11:
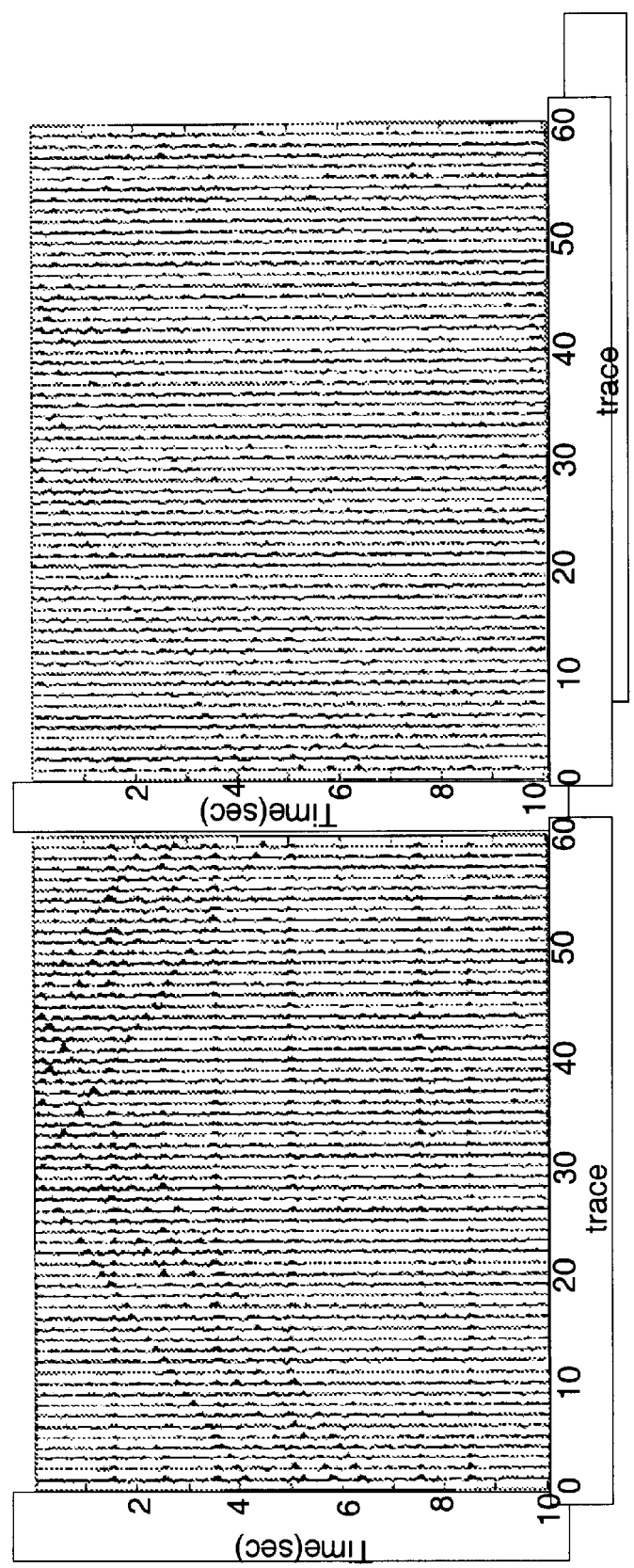
FIG. 11 illustrates the estimation errors of the f-xy prediction algorithm on the left and the f-xy projection algorithm on the right.

However, since $|A(k_x,k_y)|^2/|C(k_x,k_y)|^2$ is a projection filter its square can be approximated by itself:

$$|\hat{E}(k_x,k_y)|^2 \approx \frac{|A(k_x,k_y)|^2}{|C(k_x,k_y)|^2} |U(k_x,k_y)|^2 \quad (41)$$

$$= |G(k_x,k_y)|^2, \quad (42)$$

where the definition of g[x,y] is given FIG. 10. Thus $$\sum_{x,y} |g[x,y]|^2 \approx \sum_{x,y} |g[x,y]|^2, \quad (43)$$

so instead of minimizing the energy of $\hat{e}[x,y]$ we may proceed by minimizing the energy of g[x,y] which is a simpler task.

For this simplified case an iterative algorithm can be given:

Algorithm 1 Computation of the PEF
Inputs
The samples of the noisy data u[x,y] in a rectangular grid $0 \leq x \leq N_x-1$ and $0 \leq y \leq N_y-1$.
The initial estimate for c[x,y], denoted as $c_0[x,y]$.

Figure 7:
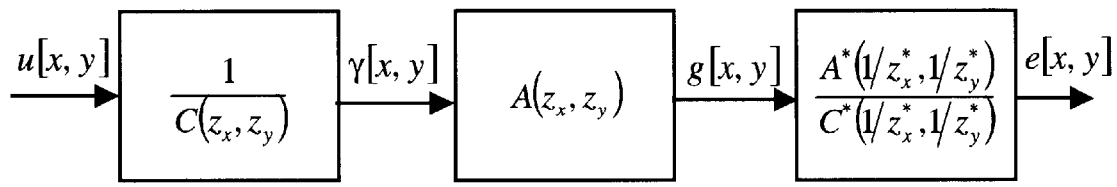
FIG. 7 shows the computation of the projection filter output, according to a preferred embodiment of the invention.
Figure 8:
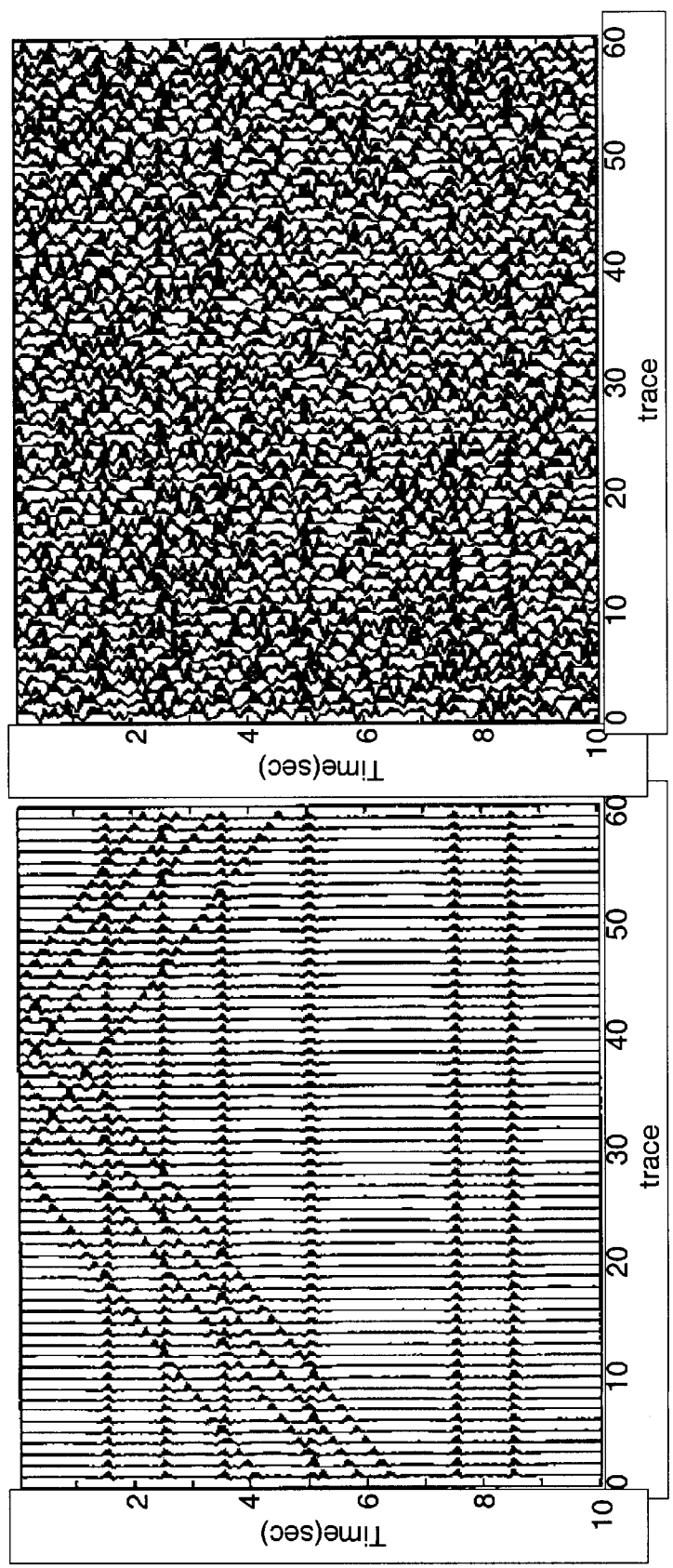
FIG. 8 illustrates an example of one in-line of the noise-free seismic data cube on the left and the noisy seismic data cube on the right.
Figure 9:
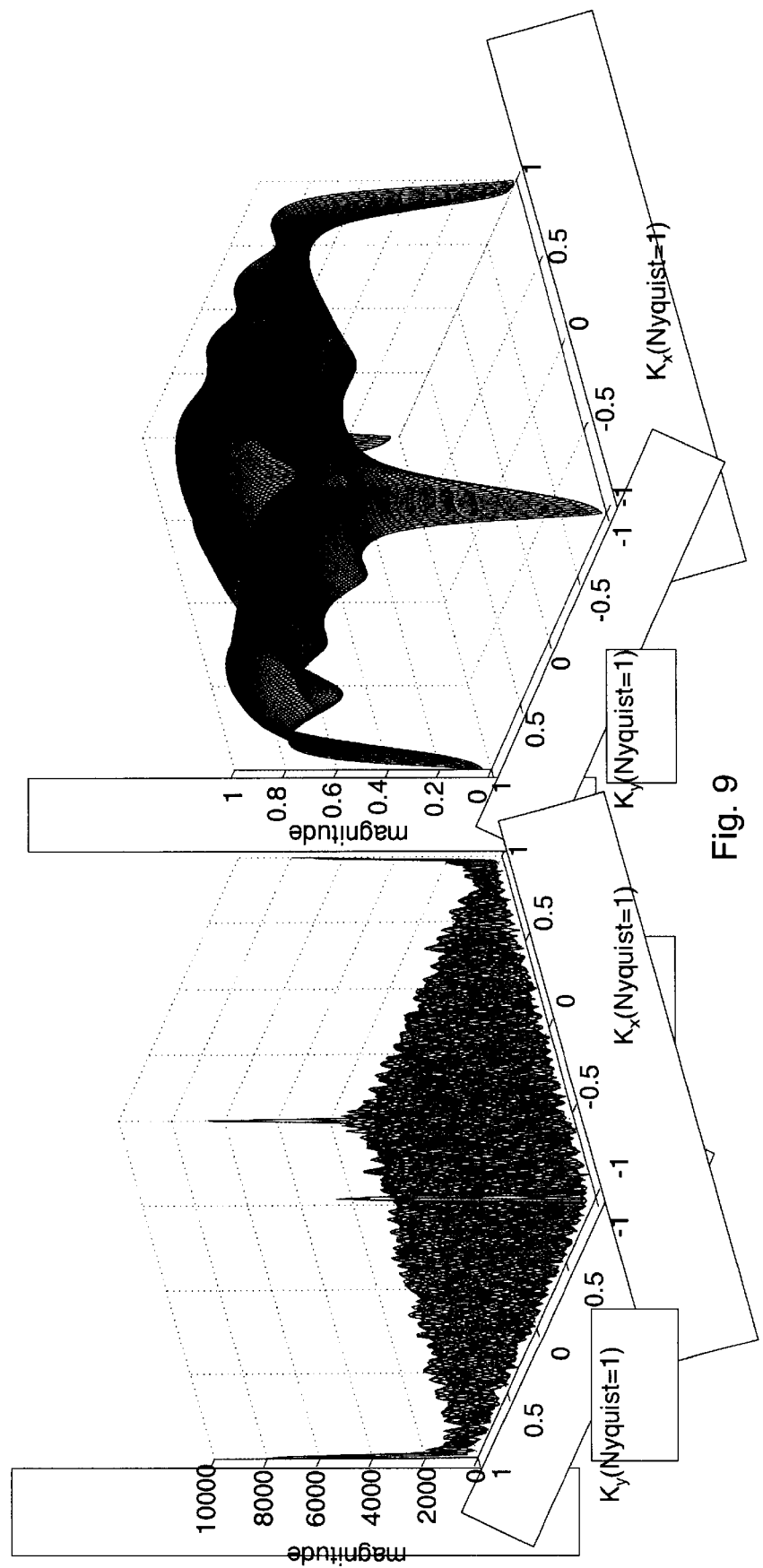
FIG. 9 illustrates the wavenumber spectra of the noisy data on the left, and the corresponding noise estimation filter on the right at the frequency f=30 Hz.

Initialization
  Set the iteration number q=0.
Steps of the Algorithm
  repeat
    Set q=q+1.
    Compute the output of the stable filter $1/C_q(z_x,z_y)$ (see FIG. 7):
    Find PEF $\alpha_q[x,y]$ for $\gamma[x,y]$ using one of the methods described above in the section on 2-D prediction error filters.
    Find the min-$\phi$ filter $c_{q+1}[x,y]$ which has the following autocorrelation $$c_{q+1}[x,y]*c_{q+1}{}'[-x,-y] = \alpha_q[x,y]*\alpha_q{}'[-x,-y]+\epsilon^2\delta[x,y].$$

until $(\Sigma_{x,y}|c_{q+1}[x,y]-c_q[x,y]|^2)/(\Sigma_{x,y}|c_{q+1}[x,y]|^2)<$Threshold
Output The filters $a[x, y] \triangleq a_q[x, y]$ and $c[x, y] \triangleq c_q[x, y]$.

Comments

Since an initial estimate of c[x,y] may not be available, it may be set to $c[x,y]=\delta[x,y]$ for the frequency f=0. For the other frequencies, the initial estimate for c[x,y] may be chosen as the converged c[x] filter of the previous frequency.

4 Synthetic Data Example

Figure 12:
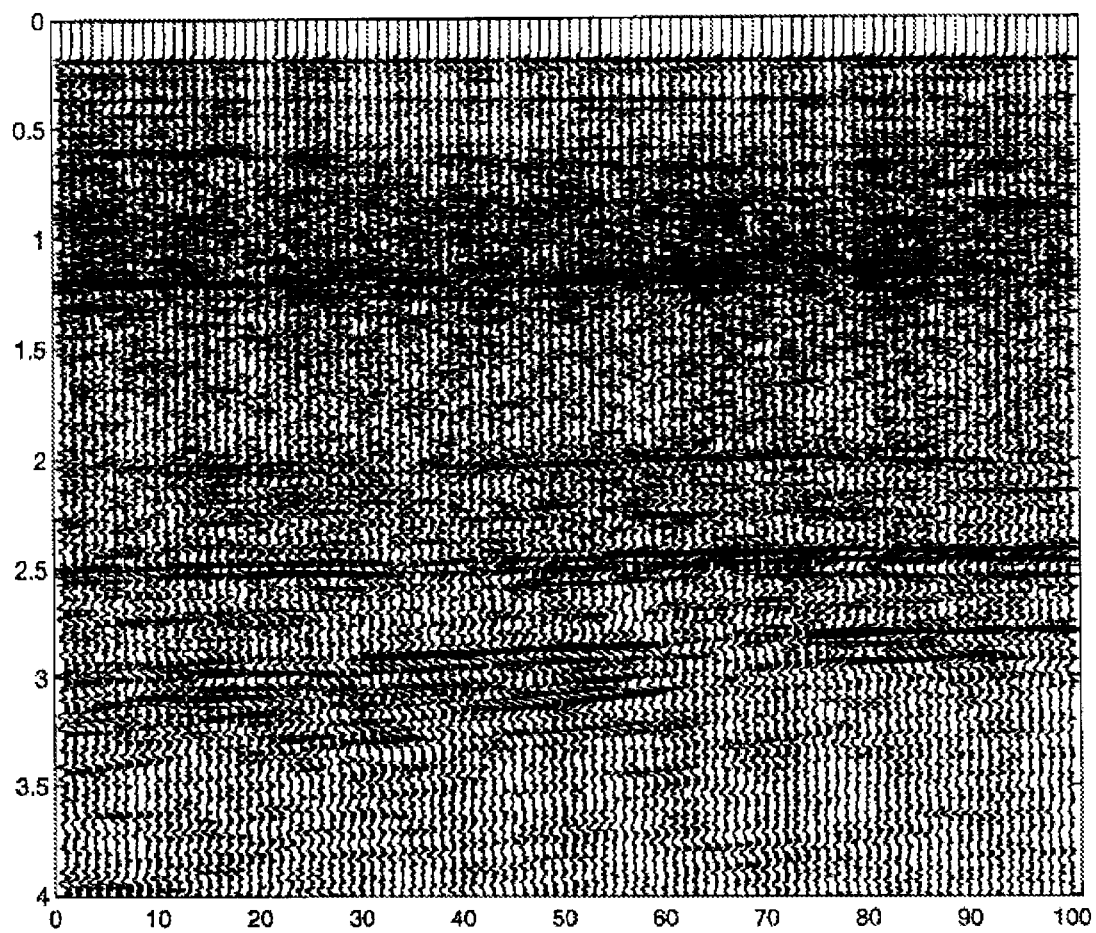
FIG. 12 illustrates one in-line of a real data cube.
Figure 13:
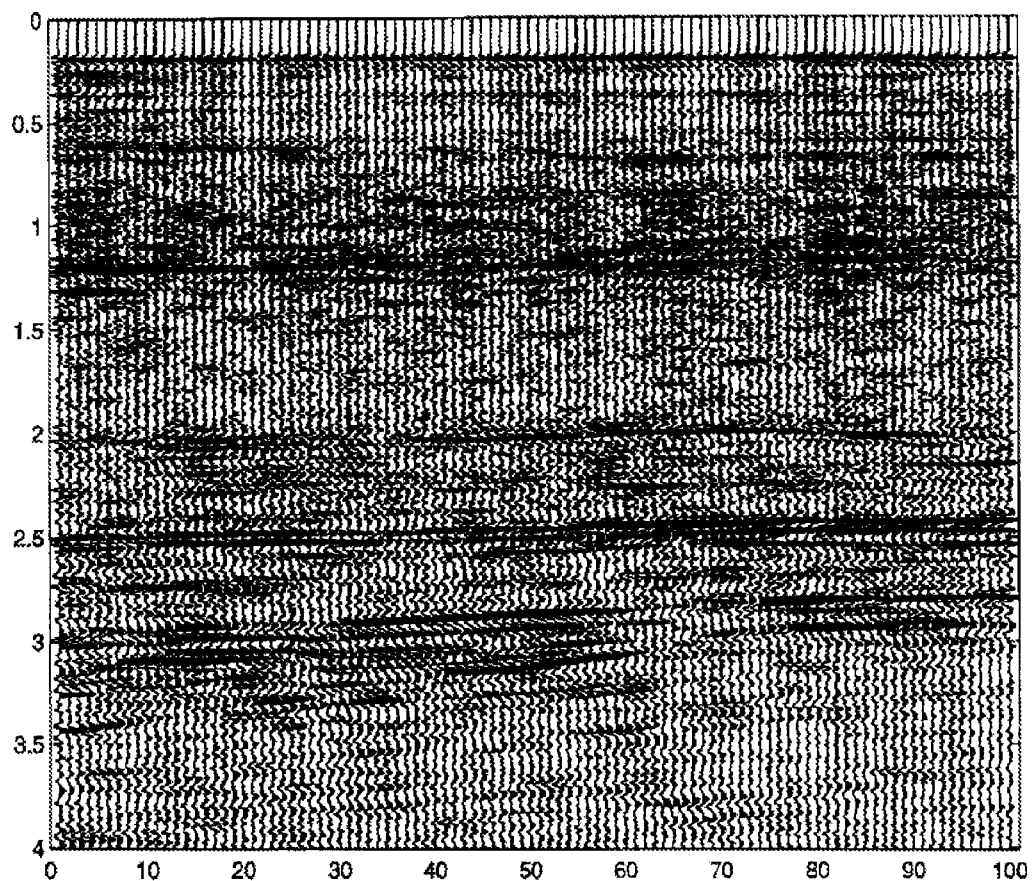
FIG. 13 illustrates the output of the f-xy prediction algorithm when applied to the real data set.

In this section, we show the results of a simulation to compare the performance of the f-xy projection algorithm with that of the f-xy prediction algorithm. The noisy input record is obtained by adding white noise to a clean, synthetic data record. The signal to noise ratio is −1.2 dB (peak-to-peak) and −12.9 dB (RMS). The 3-D data cube used in this simulation consists of 60×60 traces and 251 time samples. FIG. 12 shows one in-line of the data cube. The zero-dipping events have non-zero dip in the cross-line direction. The wavenumber spectra given in FIG. 13 is obtained with $\ominus=0.3$, and PEF order 5, using the noisy signal at f=30 Hz. As it can be verified, the spectrum of the noise estimation filter is close to 0 at the wavenumbers where the signal component is present. The output signals and estimation error of the two algorithms given in FIG. 14 and FIG. 15 justify the conclusion that the f-xy projection algorithm has a superior performance than f-xy prediction.

5 Real Data Example

Figure 14:
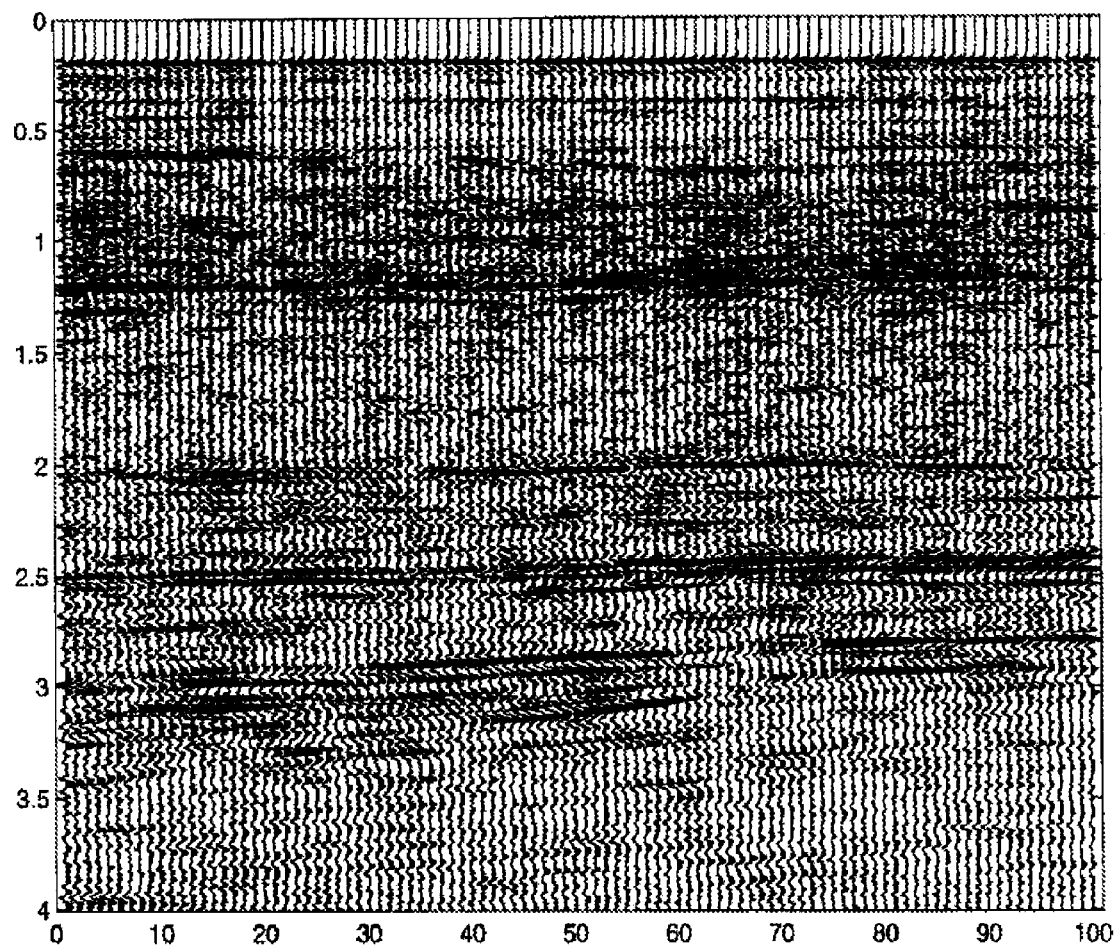
FIG. 14 illustrates the output of the f-xy projection algorithm when applied to the real data set, according to a preferred embodiment of the invention.
Figure 15:
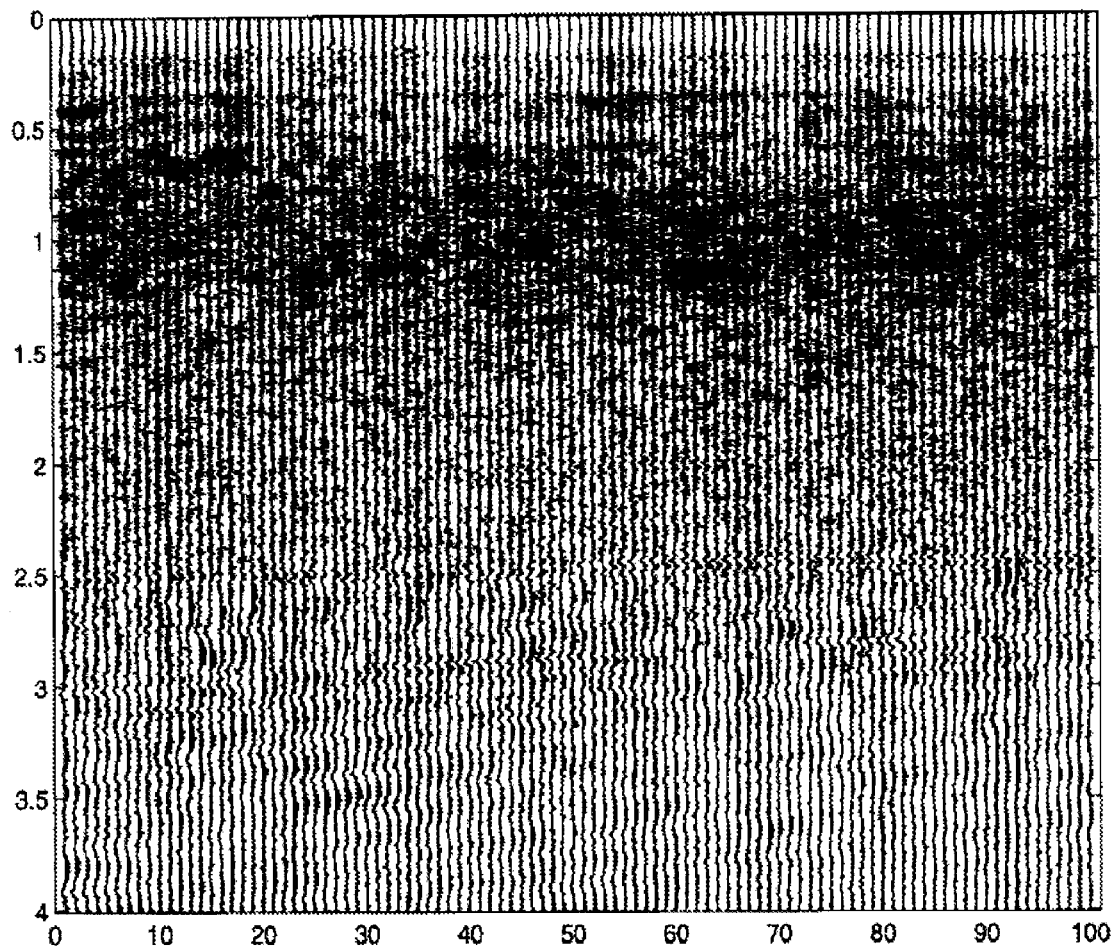
FIG. 15 illustrates the noise estimate of the f-xy prediction algorithm, magnified by 2x.
Figure 16:
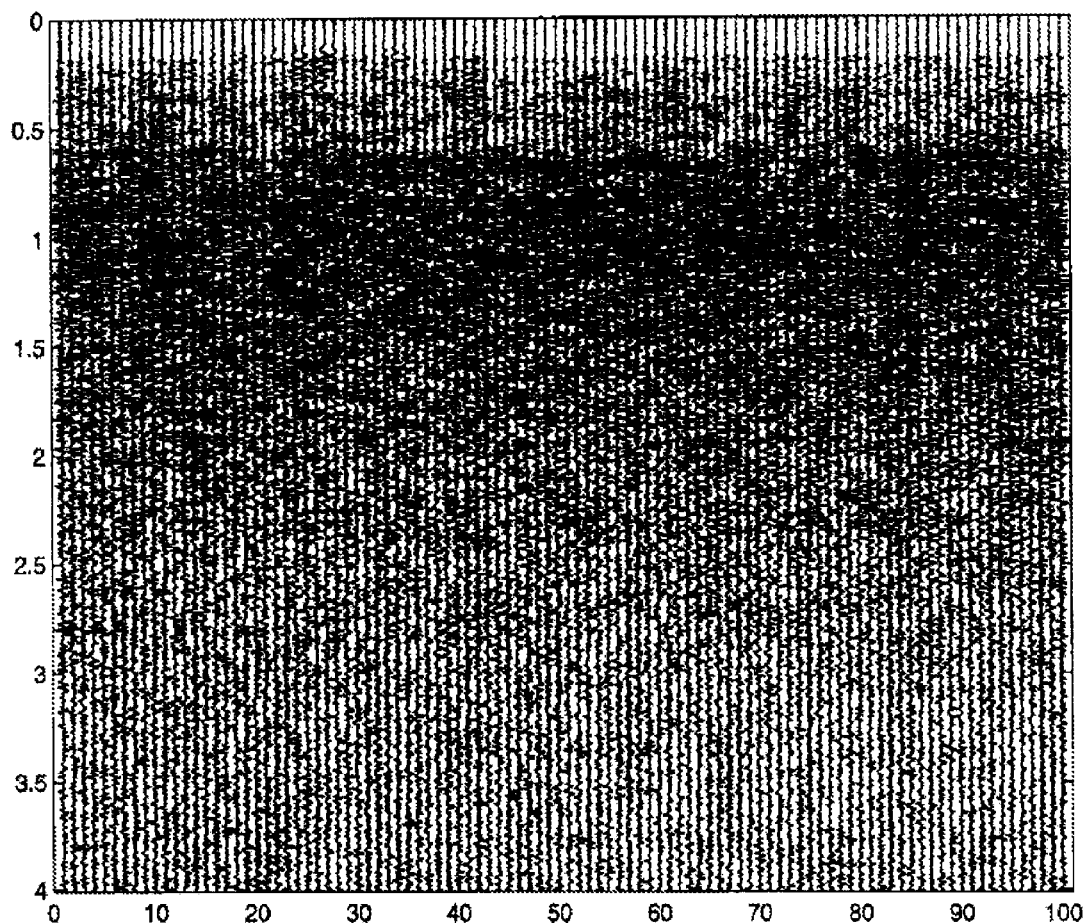
FIG. 16 illustrate the noise estimate of the f-xy projection algorithm, magnified by 2x, according to a preferred embodiment of the invention.

In this section, we compare the results of the application of the f-xy projection algorithm with that of the f-xy prediction algorithm on a real data set. FIG. 16 shows one in-line of the real data cube. The 3-D data set consists of 200×21 traces and 1001 time samples. Only the first 100 traces of an in-line are shown. FIG. 13 and FIG. 14 depict the outputs of the f-xy prediction and the f-xy projection algorithms, respectively. f-xy projection has produced a cleaner image, and some weak events like the one at 0.35 seconds is better defined. More revealing are the difference plots FIG. 15 and FIG. 16, which show the noise estimates by f-xy prediction and f-xy projection respectively. The images have been plotted with a 2× magnification to show more detail. It is clear from these figures that f-xy projection has removed more random noise, whereas f-xy prediction has removed coherent seismic reflection energy.

Figure 17:
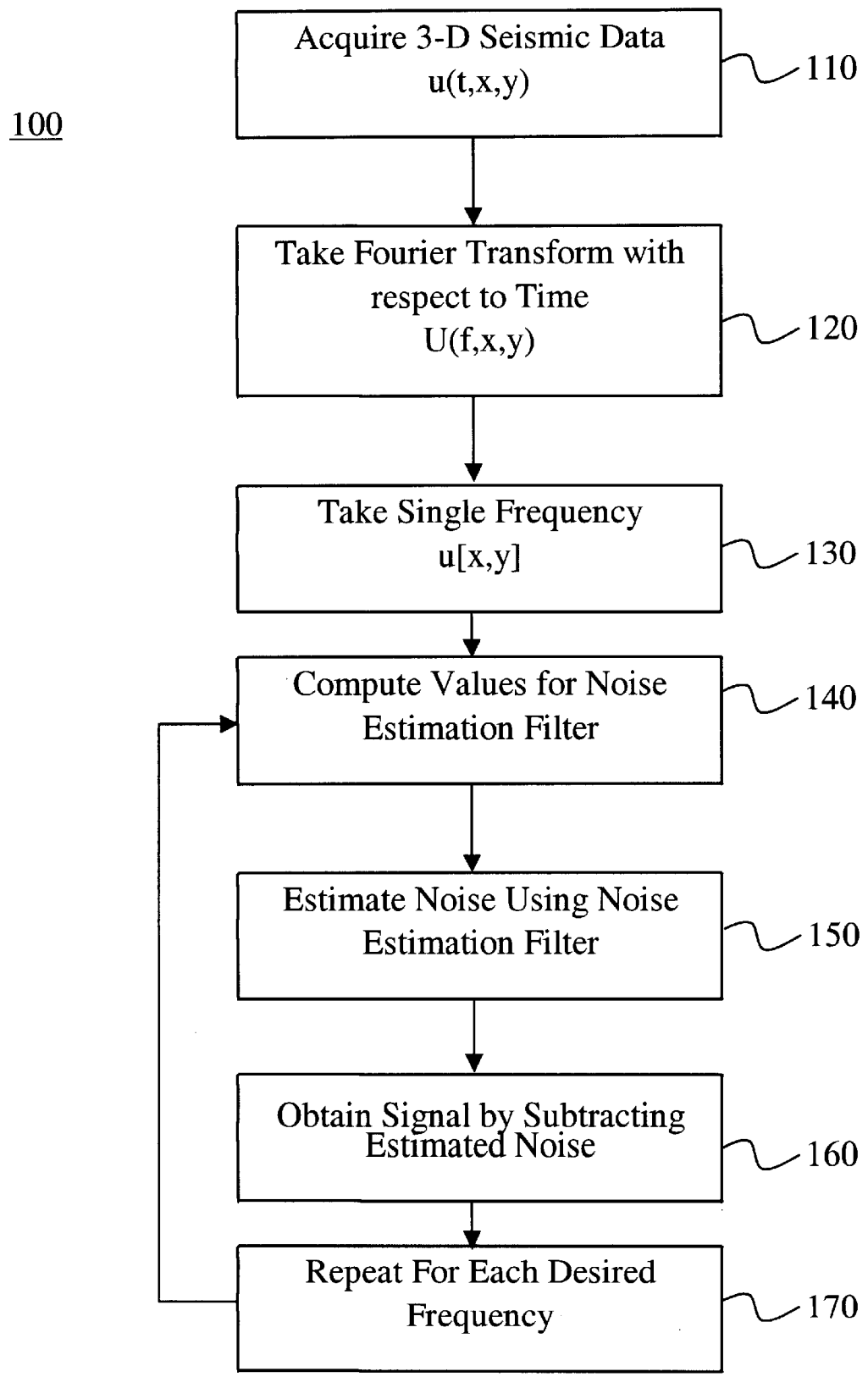
FIG. 17 is a flow chart illustrating a method of attenuating noise in three dimensional seismic data using a projection filter, according to a preferred embodiment of the invention.

FIG. 17 is a flow chart illustrating a method of attenuating noise in three dimensional seismic data using a projection filter, according to a preferred embodiment of the invention In step 110, 3-D seismic data, u(t,x,y), is aquired. In step 120, the Fourier transform is taken with respect to time (U(f,x,y)). In step 130, a single frequency is taken (u[x,y]).

In step 140, values or coefficients for the noise estimation filter are computed. Further detail as to this computation is provided in FIG. 18. In step 150, the noise is estimated using the noise estimation filter. In step 160, a signal is obtained by subtracting the estimated noise from the original signal. In step 170, the steps of 140, 150 and 160 are repeated for each desired frequency.

Figure 18:
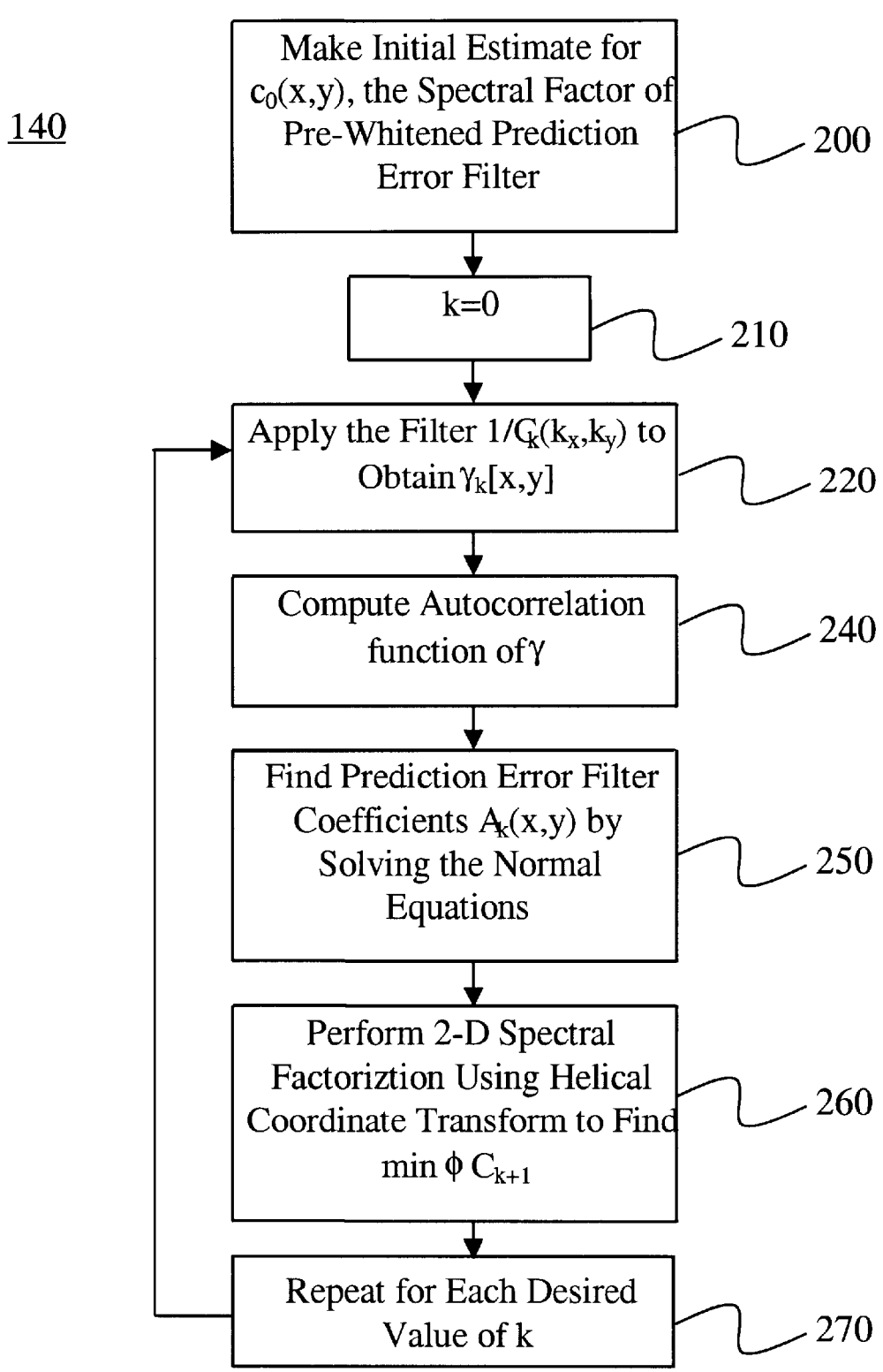
FIG. 18 is a flow chart illustrating a method of computing values for a noise estimation filter, according to a preferred embodiment of the invention.

FIG. 18 is a flow chart illustrating a method of computing values for a noise estimation filter, according to a preferred embodiment of the invention. In step 200 an initial estimate is made for $c_0(x,y)$, the spectral factor of a pre-whitened prediction error filter. In step 210 k is set to an initial value of 0. In step 220, the filter $1/C_k(k_x,k_y)$ is applied to obtain $\gamma_k[x,y]$. In step 240 an autocorrelation function of $\gamma$ is computed. In step 250, prediction error filter coefficients $A_k(x,y)$ are found by solving the normal equation. In step 260, 2-D spectral factorization is performed using a helical coordinate transform to find min $\phi$ $C_{k+1}$. In step 270, the steps of 220, 240, 250, and 260 are repeated each desired value of k.

Figure 19:
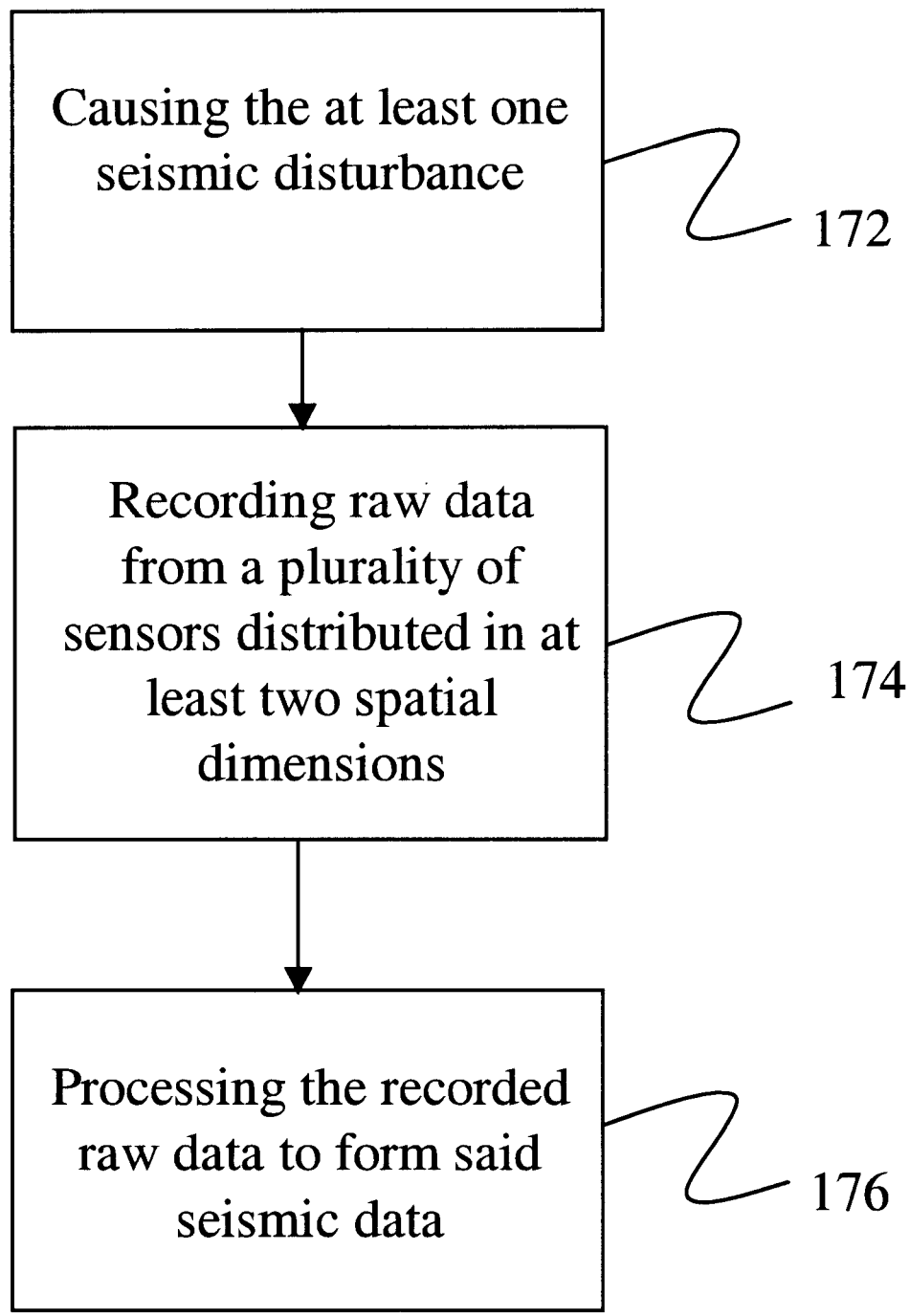
FIG. 19 is a flow chart illustrating a method of recording raw data from seismic disturbances, according to a preferred embodiment of the invention.

FIG. 19 is a flow chart illustrating a method of recording raw data from seismic disturbances, according to a preferred embodiment of the invention. In step 172 at least one seismic disturbance is caused. In step 174, the raw data is recorded from a plurality of sensors distributed in at least two spatial dimensions. In step 176 the recorded raw data is processed to form seismic data.

According to the invention, an f-xy projection algorithm has been provided. The algorithm exploits the predictability of the seismic signals in the f-xy domain. With computer simulations conducted on the synthetic data, it has been shown that the algorithm can be used at very low SNRs and it outperforms the f-xy prediction algorithm. While the preferred embodiments of the invention have been described, the examples and the particular algorithm described are merely illustrative and are not intended to limit the present invention.

What is claimed is:

1. A method of attenuating noise in three dimensional seismic data comprising the steps of:
   receiving seismic data representing data gathered in at least two spatial dimensions and a time dimension, said seismic data including a seismic signal component and a noise component, said seismic signal component representing signals originating from at least one seismic disturbance;
   computing coefficients for use in a plurality of projection filters, the step of computing including spectral factorization in at least two dimensions, each one of said projection filters used to estimate the noise component of said seismic data at one frequency;
   estimating the noise component in said received seismic data by applying each projection filter to a corresponding frequency component of the data; and
   subtracting the estimated noise component from the received data to obtain attenuated seismic data having a decreased noise component.

2. The method of claim 1 further comprising the steps of:
   causing the at least one seismic disturbance;
   recording raw data from a plurality of sensors distributed in at least two spatial dimensions; and
   processing the recorded raw data to form said seismic data.

3. The method of claim 2 further comprising the steps of:
   performing a Fourier Transform with respect to time of said seismic data to obtain frequency domain seismic data;

selecting a single frequency from said frequency domain seismic data; and repeating for each desired frequency said steps of computing values, performing spectral factorization, estimating the noise component, and subtracting the estimated noise.

4. The method of claim 3 wherein the step of computing comprises the steps of:

creating an initial estimate for an initial spectral factor sequence of values to be used in said projection filter;

applying an all-pole filter based on the inverse of the square of the initial spectral factor sequence of values to obtain an intermediate sequence of values;

computing an autocorrelation of the intermediate sequence of values; and finding a Prediction Error Filter of the intermediate sequence of values by solving normal equations using the autocorrelation of the intermediate sequence of values thereby determining some of the coefficients for use in the projection filter.

5. The method of claim 4 wherein said spectral factorization in at least two dimensions comprises the steps of:

using a helical coordinate transform on the autocorrelation of the intermediate sequence of values to obtain a one-dimensional sequence;

performing a spectral factorization on the one-dimensional sequence to obtain a one-dimensional factor;

mapping the one-dimensional factor into two-dimensions using an inverse of the helical coordinate transform to obtain a two-dimensional factor which represents some of said coefficients; and repeating the steps of applying an all-pole filter, computing an autocorrelation, finding a Prediction Error Filter, using a helical coordinate transform, performing a spectral factorization, and mapping until convergence is obtained.

6. The method of claim 1 wherein the projection filter estimates primarily random noise.

7. The method of claim 1 wherein the projection filter estimates primarily coherent noise.

* * * * *